US012806967B2

(12) United States Patent
Kim et al.

(10) Patent No.: US 12,806,967 B2
(45) Date of Patent: Nov. 24, 2026

(54) VEHICLE THERMAL MANAGEMENT SYSTEM

(71) Applicant: HANON SYSTEMS, Daejeon (KR)

(72) Inventors: Jae Hoon Kim, Daejeon (KR); Hae Jun Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 41 days.

(21) Appl. No.: 18/851,714

(22) PCT Filed: Jun. 20, 2023

(86) PCT No.: PCT/KR2023/008530
§ 371 (c)(1),
(2) Date: Sep. 27, 2024

(87) PCT Pub. No.: WO2024/019340
PCT Pub. Date: Jan. 25, 2024

(65) Prior Publication Data

US 2025/0214396 A1 Jul. 3, 2025

(30) Foreign Application Priority Data

Jul. 20, 2022 (KR) ........................ 10-2022-0089744

(51) Int. Cl.
*B60H 1/32* (2006.01)
*B60H 1/00* (2006.01)
*B60H 1/14* (2006.01)

(52) U.S. Cl.
CPC ..... *B60H 1/32284* (2019.05); *B60H 1/00885* (2013.01); *B60H 1/143* (2013.01); *B60H 1/3213* (2013.01)

(58) Field of Classification Search
CPC .. B60H 1/32284; B60H 1/00278; B60H 1/00; B60H 1/00885; B60H 1/00921;
(Continued)

(56) References Cited

U.S. PATENT DOCUMENTS

2010/0012295 A1 1/2010 Nemesh et al.
2012/0210746 A1 8/2012 Kadle et al.
(Continued)

FOREIGN PATENT DOCUMENTS

KR 20190124931 A 11/2019
KR 20200038032 A 4/2020
KR 20210057313 A 5/2021

OTHER PUBLICATIONS

International Search Report issued in PCT/KR2023/008530 on Sep. 19, 2023.

*Primary Examiner* — Paul Alvare
*Assistant Examiner* — Kamran Tavakoldavani
(74) *Attorney, Agent, or Firm* — NORTON ROSE FULBRIGHT US LLP

(57) ABSTRACT

Vehicle thermal management system comprising a refrigerant line circulating through a compressor, a condenser, an expansion valve, a chiller; a cooling heat exchanger and a heating heat exchanger provided in an air conditioner case so as to cool air and heat air, respectively; a first coolant line passing through the heating heat exchanger and carrying out heat exchange with the condenser of the refrigerant line; a second coolant line passing through the cooling heat exchanger and carrying out heat exchange with the chiller of the refrigerant line; a radiator enabling heat exchange between a coolant and outdoor air; a third coolant line passing through the radiator and carrying out heat exchange with a battery of a vehicle; and a coolant valve part for controlling the flow of a coolant of the second coolant line so that the coolant flows in series through the chiller, the cooling heat exchanger, the battery.

8 Claims, 16 Drawing Sheets

(58) Field of Classification Search
CPC . B60H 1/14; B60H 1/143; B60H 1/32; B60H 1/3213; B60H 2001/00307
See application file for complete search history.

(56) References Cited

U.S. PATENT DOCUMENTS

| | | | | |
|---|---|---|---|---|
| 2019/0366800 | A1* | 12/2019 | Durrani | B60H 1/00907 |
| 2020/0047591 | A1* | 2/2020 | He | B60H 1/32284 |
| 2020/0343610 | A1* | 10/2020 | Agathocleous | H01M 10/44 |
| 2020/0361275 | A1* | 11/2020 | Hwang | B60H 1/3213 |
| 2021/0001688 | A1* | 1/2021 | Kim | B60H 1/00921 |
| 2021/0016625 | A1* | 1/2021 | Lee | B60H 1/00278 |
| 2021/0138867 | A1* | 5/2021 | Kim | B60H 1/32284 |

* cited by examiner

VEHICLE THERMAL MANAGEMENT SYSTEM

CROSS REFERENCE TO RELATED APPLICATIONS

This patent application is a national phase under 35 U.S.C. § 371 of International Patent Application No. PCT/KR2023/008530 filed Jun. 20, 2023, which claims the benefit of priority from Korean Patent Application No. 10-2022-0089744 filed Jul. 20, 2022, each of which is hereby incorporated herein by reference in its entirety for all purposes.

TECHNICAL FIELD

The present invention relates to a vehicle thermal management system, and more particularly, to a vehicle thermal management system, which is installed in an electric vehicle or the like, to perform air conditioning in the interior of the vehicle and perform thermal management of a battery and electric components.

BACKGROUND ART

In general, a vehicle air conditioner includes a cooling system for cooling the interior of a vehicle, and a heating system for heating the interior of the vehicle. The cooling system is configured to cool the interior of the vehicle by exchanging heat between a refrigerant flowing through an evaporator and air passing through the evaporator. Additionally, the heating system is configured to heat the interior of the vehicle by exchanging heat between a coolant flowing through the heater core and the air passing through the heater core.

Recently, a vehicle, such as an electric vehicle, using a battery, uses a vehicle heat pump system which cools the battery and waste heat from electric components a chiller exchanging heat between a coolant and a refrigerant. Consequently, during the operation of the heat pump, the heat pump system improves the performance of the heat pump by recovering the air heat source via an outdoor unit, the waste heat of the electric components through a water-refrigerant heat exchanger (chiller), and the waste heat of the battery.

A conventional thermal management system for an electric vehicle is a direct heating type heat pump system which directly uses the heat of the refrigerant for heating. So, the conventional thermal management system has several disadvantages in that the configuration of the system for realizing heating and cooling is complex, weight and cost are increased due to an increase in the number of components, and the amount of refrigerant used is increased. Additionally, the conventional thermal management system for the electric vehicle is a system that can operate only when the refrigerant components are distributed, so the vehicle assemblability is reduced since it is difficult to modularize components.

DISCLOSURE

Technical Problem

Accordingly, the present invention has been made in view of the above-mentioned problems occurring in the related art, and it is an object of the present invention to provide a vehicle thermal management system that can reduce the power of an electric compressor by performing an active individual cooling system depending on the heat generation amount of a battery and implement a high-capacity cooling system in response to rapid battery charging.

Furthermore, it is another object of the present invention to provide a vehicle thermal management system that can realize various air conditioning modes, enhance the heating performance of a heat pump, and enable interior heating only with the waste heat of electric components and the battery, and allow battery temperature rise through the heat pump.

Technical Solution

To accomplish the above-mentioned objects, according to the present invention, there is provided a vehicle thermal management system including: a refrigerant line circulating through a compressor, a condenser, an expansion valve, a chiller; a cooling heat exchanger and a heating heat exchanger provided in an air conditioning case to cool air and heat air, respectively; a first coolant line passing through the heating heat exchanger and exchanging heat with the condenser of the refrigerant line; a second coolant line passing through the cooling heat exchanger and exchanging heat with the chiller of the refrigerant line; a radiator enabling heat exchange between a coolant and outdoor air; a third coolant line passing through the radiator and exchanging heat with a battery of a vehicle; and a coolant valve part for controlling the flow of the coolant so that the coolant of the second coolant line flows through the chiller, the cooling heat exchanger, and the battery in series.

The coolant passing through the radiator selectively passes through electric components of the vehicle.

The coolant valve part includes: a first valve which is located between the electric components, the chiller, and a second valve, and selectively directs the coolant passing through the electric components to the chiller or the second valve; and the second valve which is located between the first valve, the condenser, the heating heat exchanger, and the third coolant line, and selectively directs the coolant passing through the first valve to the condenser or the third coolant line, or selectively directs the coolant passing through the heating heat exchanger to the condenser or the third coolant line.

The third coolant line includes a first connection unit which connects the second valve and the third coolant line.

The coolant valve part includes a third valve, which is located between the radiator, the chiller, the cooling heat exchanger, and the first connection unit, selectively directs the coolant passing through the chiller to the cooling heat exchanger or the radiator, or selectively directs the coolant passing through the first connection unit to the radiator or the cooling heat exchanger.

The coolant valve part includes: a fourth valve which is located between the chiller, a fifth valve, the battery, and the cooling heat exchanger, and selectively directs the coolant passing through the cooling heat exchanger to the chiller or the battery, or selectively directs the coolant passing through the fifth valve to the chiller or the battery; and the fifth valve which is located between the battery, the first connection unit, and the fourth valve, and selectively directs the coolant passing through the battery to the first connection unit or the fourth valve, or directs the coolant passing through the first connection unit to the battery.

The second coolant line includes a second connection unit which connects the first valve to the second coolant line, and the second connection unit is positioned between the fourth valve and the chiller.

The third coolant line includes a third connection unit which connects the radiator to the third coolant line, and the third connection unit is positioned between the fourth valve and the battery.

In a simultaneous cooling mode for the electric components and the battery, the coolant flow in both the first coolant line and the second coolant line is stopped. The coolant sequentially passes through the battery, the fifth valve, the first connection unit, the third valve, and the radiator, and a portion of the coolant passing through the radiator circulates through the battery and another portion of the coolant sequentially passes through the electric components, the first valve, the second valve, the first connection unit, and the third valve, and then, circulates through the radiator.

In a battery rapid cooling mode, the refrigerant in the refrigerant line sequentially circulates through the compressor, the condenser, the expansion valve, and the chiller. The coolant passing through the battery sequentially circulates through the fifth valve, the fourth valve, the chiller, the third valve, the cooling heat exchanger, the fourth valve, and the battery.

In a cooling mode, the refrigerant in the refrigerant line sequentially circulates through the compressor, the condenser, the expansion valve, and the chiller. The coolant passing through the cooling heat exchanger sequentially passes through the fourth valve, the chiller, and the third valve, and then, circulates through the cooling heat exchanger.

In a heating mode which absorbs heat from the outdoor air and the electric components, the refrigerant in the refrigerant line sequentially circulates through the compressor, the condenser, the expansion valve, and the chiller. The coolant passing through the heating heat exchanger passes through the second valve and the condenser, and circulates through the heating heat exchanger. The coolant passing through the radiator sequentially passes through the electric components, the first valve, the chiller, and the third valve, and circulates through the radiator.

In a heat absorption and heating mode, the coolant passing through the heating heat exchanger passes through the second valve and the first connection unit, and a portion of the coolant passing through the first connection unit sequentially passes through the third valve, the radiator, the electric components, the first valve, the second valve, and the condenser, and then, circulates through the heating heat exchanger, and another portion of the coolant sequentially passes through the fifth valve, the battery, the electric components, the first valve, the second valve, and the condenser, and then, circulates through the heating heat exchanger.

Advantageous Effect

The vehicle thermal management system according to the present invention can provide an integrated thermal management system for an electric vehicle, which can perform cooling, heating, and dehumidification of the interior of the vehicle, cooling and heat absorption of the electric components, general cooling of the battery and rapid cooling of the battery during rapid charging, and temperature rise of the battery at low temperature. Additionally, the vehicle thermal management system can simultaneously perform the functions of interior cooling and battery cooling with a single chiller part, and when the ambient temperature is lower than the set temperature for cooling the battery, can perform heat dissipation from the radiator without operation of the chiller.

Moreover, the vehicle thermal management system according to the present invention can realize fourteen different operation modes with a very simple structure. Furthermore, the vehicle thermal management system according to the present invention can reduce power of the electric compressor through an active individual cooling system depending on the heat generation amount of the battery, minimize overcooling, and contribute to improvement of vehicle fuel efficiency. Additionally, the vehicle thermal management system according to the present invention enables a high-capacity rapid cooling system in response to rapid battery charging. Furthermore, the vehicle thermal management system according to the present invention can secure cost competitiveness by simplifying the refrigerant lines and reducing the number of heat exchangers and refrigerant valves. In addition, the vehicle thermal management system according to the present invention can perform interior heating using only the waste heat from the electric components and the battery, and raise the temperature of the battery through the heat pump, and minimize power consumption.

MODE FOR INVENTION

Hereinafter, referring to the attached drawings, the technical configuration of a vehicle thermal management system will be described as follows.

Figure 1:
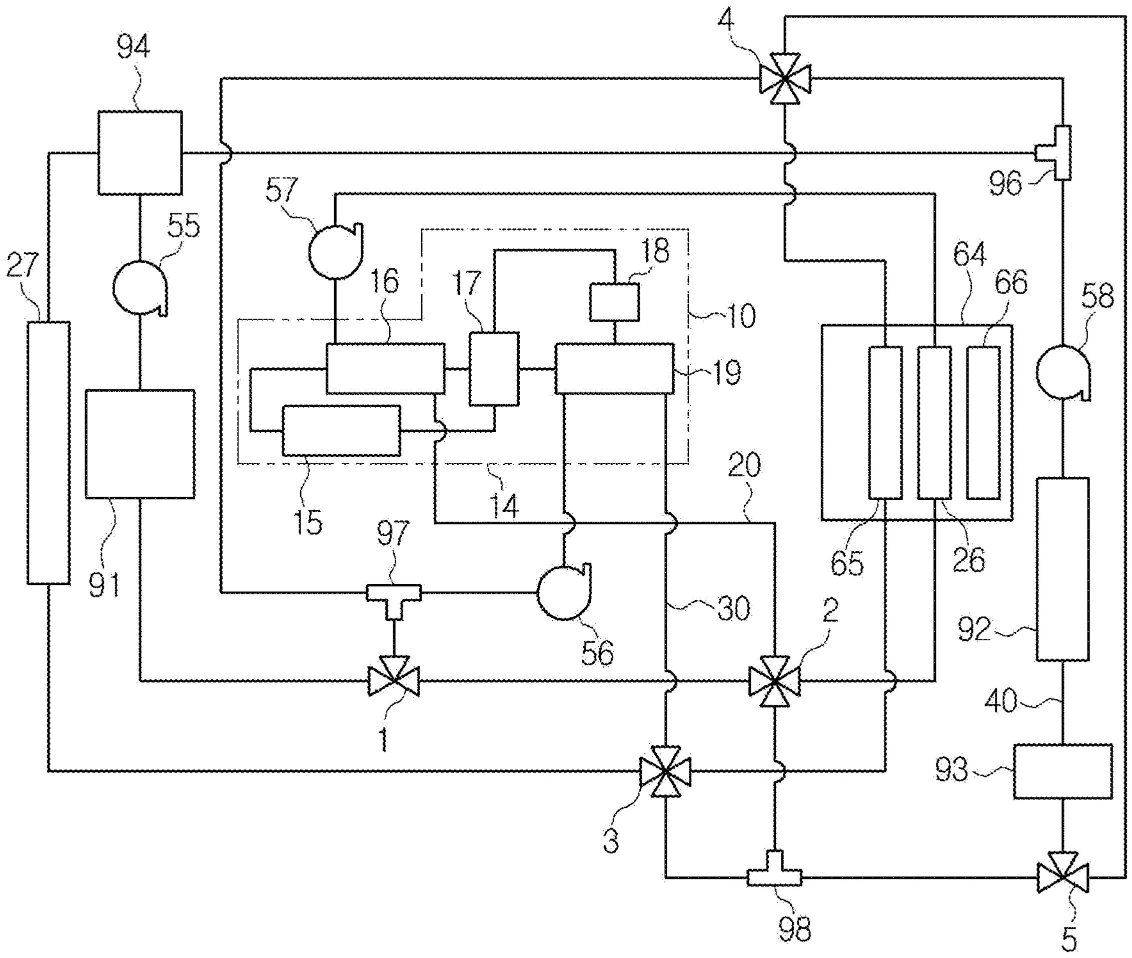
FIG. 1 illustrates a vehicle thermal management system according to an embodiment of the present invention.
Figure 2:
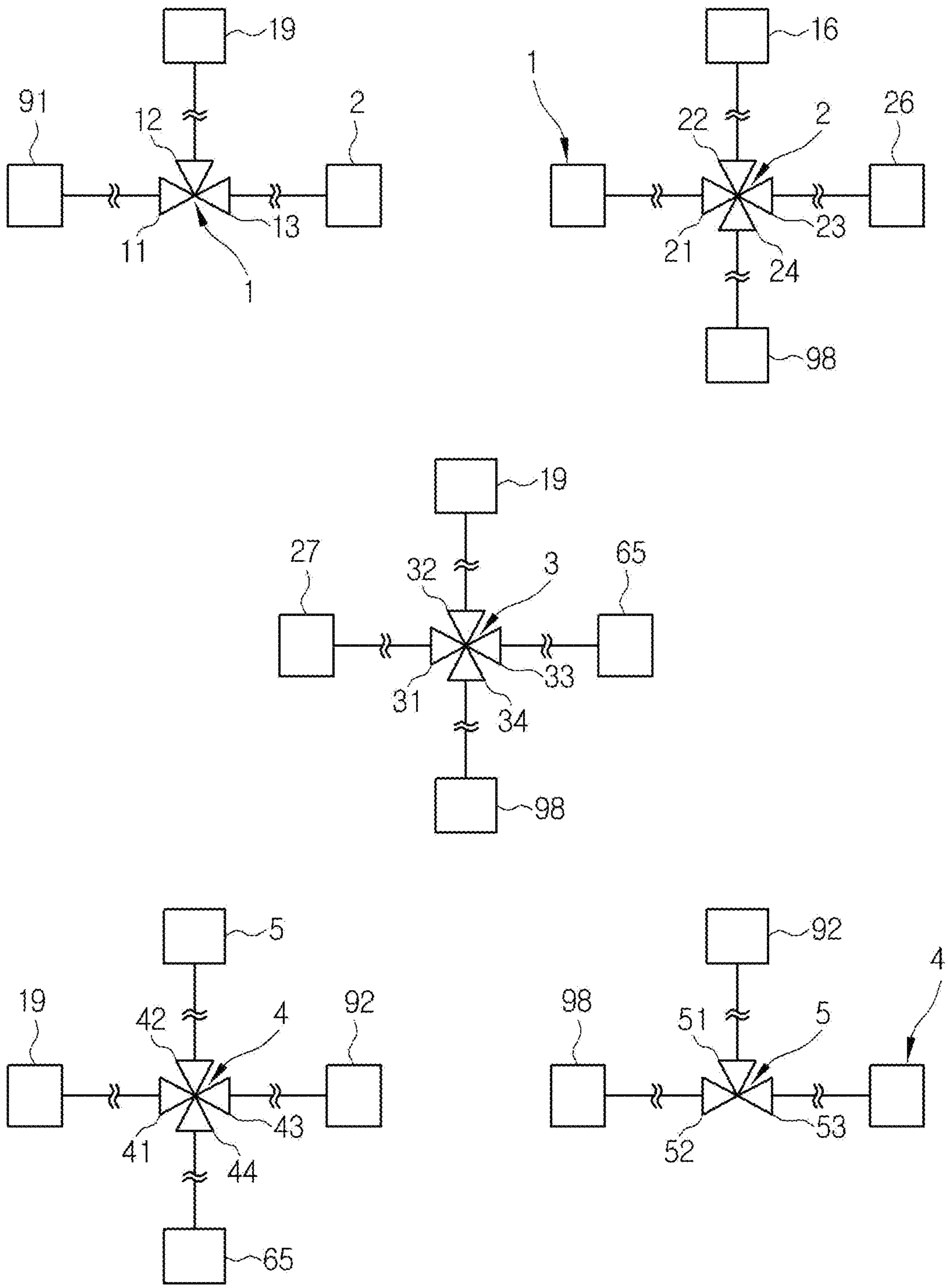
FIG. 2 illustrates first to fifth valves according to an embodiment of the present invention.

Referring to FIGS. 1 and 2, the vehicle thermal management system according to an embodiment of the present invention, which is installed in an electric vehicle, includes a cooling heat exchanger 65, a heating heat exchanger 26, a refrigerant module 10, a first coolant line 20, a second coolant line 30, a radiator 27, a third coolant line 40, and a coolant valve part.

The cooling heat exchanger 65 and the heating heat exchanger 26 are sequentially provided within air an conditioning case 64 in an air flow direction. The heating heat exchanger 26 exchanges heat with the air within the air conditioning case 64 to heat the air, and the cooling heat exchanger 65 exchanges heat with the air within the air conditioning case 64 to cool the air. An electric heater 66 such as a PTC which heats up according to application of power is provided downstream of the heating heat exchanger 26.

The refrigerant module 10 includes a refrigerant line 14 where a refrigerant sequentially circulates through a compressor 15, a condenser 16, an expansion valve 18, and a chiller 19. The compressor 15 sucks and compresses the refrigerant, and then, discharges the refrigerant in a high-temperature and high-pressure gaseous state. The condenser 16 functions as a water-cooled condenser which exchanges heat between the refrigerant and a coolant. The expansion valve 18 expands the refrigerant passed through the condenser 16 into a low-temperature and low-pressure state. The chiller 19 functions as a water-cooled evaporator which exchanges heat between the refrigerant and the coolant. An internal heat exchanger 17 is provided between the condenser 16 and the expansion valve 18 and between the chiller 19 and the compressor 15.

The first coolant line 20 passes through the heating heat exchanger 26 and exchanges heat with the condenser 16 of the refrigerant line 14. The heating heat exchanger 26, the condenser 16, and a first water pump 57 are provided within the first coolant line 20. The first water pump 57 circulates the coolant of the first coolant line 20.

The second coolant line 30 passes through the cooling heat exchanger 65 and exchanges heat with the chiller 19 of the refrigerant line 14. The cooling heat exchanger 65, a second water pump 56, and the chiller 19 are provided within the second coolant line 30. The second water pump 56 circulates the coolant of the second coolant line 30.

The radiator 27 exchanges heat between the coolant and the outdoor air, and functions as an integrated air-cooled condenser. The third coolant line 40 passes through the radiator 27 and exchanges heat with a battery 92 of the vehicle. The battery 92, a coolant heater 93, the radiator 27, a reservoir tank 94, and a third water pump 58 are provided within the third coolant line 40. The coolant heater 93 is an electric heater, and heats the coolant of the third coolant line 40. The third water pump 58 circulates the coolant of the third coolant line 40.

The coolant valve part controls the coolant flow so that the coolant of the second coolant line 30 flows through the chiller 19, the cooling heat exchanger 65, and the battery 92 in series. Additionally, the coolant valve part enables the coolant passing through the radiator 27 to selectively pass through the electric components 91 of the vehicle. The coolant valve part includes a first valve 1, a second valve 2, a third valve 3, a fourth valve 4, and a fifth valve 5.

In addition, the third coolant line 40 includes a first connection unit 98. The first connection unit 98 connects the second valve 2 to the third coolant line 40. Moreover, the second coolant line 30 includes a second connection unit 97. The second connection unit 97 connects the first valve 1 to the second coolant line 30. The second connection unit 97 is placed between the fourth valve 4 and the chiller 19. Meanwhile, the third coolant line 40 includes a third connection unit 96. The third connection unit 96 connects the radiator 27 to the third coolant line 40. The third connection unit 96 is placed between the fourth valve 4 and the battery 92.

The first valve 1 is located between the electric components 91, the chiller 19, and the second valve 2. The first valve 1 selectively directs the coolant passing through the electric components 91 either to the chiller 19 or the second valve 2. A fourth water pump 55 is provided in the coolant line at the front end of the electric components 91. The fourth water pump 55 circulates the coolant passing through the radiator 27 towards the electric components 91 and the first valve 1. The first valve 1 is a three-way valve.

That is, the first valve 1 includes a first connector 11, a second connector 12, and a third connector 13. The first connector 11 is connected to the electric components 91, and the second connector 12 is connected to the second connection unit 97 of the first coolant line 20. The coolant passing through the electric components 91 is introduced into the first connector 11 and is discharged through the second connector 12 or the third connector 13.

The second valve 2 is provided between the first valve 1, the condenser 16, the heating heat exchanger 26, and the third coolant line 40. The second valve 2 selectively directs the coolant passing through the first valve 1 to the condenser 16 or the third coolant line 40, or directs the coolant passing through the heating heat exchanger 26 to the condenser 16 or the third coolant line 40. The second valve 2 is a four-way valve.

That is, the second valve 2 includes a first connector 21, a second connector 22, a third connector 23, and a fourth connector 24. The first connector 21 is connected to the first valve 1, and the second connector 22 is connected to the condenser 16. The third connector 23 is connected to the heating heat exchanger 26, and the fourth connector 24 is connected to the first connection unit 98. The coolant passing through the first valve 1 is introduced into the first connector 21 and is discharged through the second connector 22 or the fourth connector 24. Additionally, the coolant passing through the heating heat exchanger 26 is introduced into the third connector 23 and is discharged through the second connector 22 or the fourth connector 24.

The third valve 3 is provided between the radiator 27, the chiller 19, the cooling heat exchanger 65, and the first connection unit 98. The third valve 3 selectively directs the coolant passing through the chiller 19 to the cooling heat exchanger 65 or the radiator 27, or directs the coolant passing through the first connection unit 98 to the radiator 27 or the cooling heat exchanger 65. The third valve 3 is a four-way valve.

That is, the third valve 3 includes a first connector 31, a second connector 32, a third connector 33, and a fourth connector 34. The first connector 31 is connected to the radiator 27, and the second connector 32 to the chiller 19. The third connector 33 is connected to the cooling heat exchanger 65, and the fourth connector 34 is connected to the first connection unit 98. The coolant passing through the chiller 19 is introduced into the second connector 32 and is discharged through the first connector 31 or the third connector 33. Additionally, the coolant passing through the first connection unit 98 is introduced into the fourth connector 34 and is discharged through the first connector 31 or the third connector 33.

The fourth valve 4 is provided between the chiller 19, the fifth valve 5, the battery 92, and the cooling heat exchanger 65. The fourth valve 4 selectively directs the coolant passing through the cooling heat exchanger 65 to the chiller 19 or the battery 92, or directs the coolant passing through the fifth valve 5 to the chiller 19 or the battery 92. The fourth valve 4 is a four-way valve.

That is, the fourth valve 4 includes a first connector 41, a second connector 42, a third connector 43, and a fourth connector 44. The first connector 41 is connected to the chiller 19, and the second connector 42 is connected to the fifth valve 5. More specifically, the first connector 41 is connected to the second connection unit 97. That is, as described above, the second connection unit 97 is positioned between the fourth valve 4 and the chiller 19.

Furthermore, the third connector 43 is connected to the battery 92, and the fourth connector 44 is connected to the cooling heat exchanger, the third connector 43 is connected to the third connection unit 96. That is, the third connection unit 96 is positioned between the fourth valve 4 and the battery 92. The coolant passing through the cooling heat exchanger 65 is introduced into the fourth connector 44 and is discharged through the first connector 41 or the third connector 43. Additionally, the coolant passing through the fifth valve 5 is introduced into the second connector 42 and is discharged through the first connector 41 or the third connector 43.

The fifth valve 5 is provided between the battery 92, the first connection unit 98, and the fourth valve 4. The fifth valve 5 selectively directs the coolant passing through the battery 92 to the first connection unit 98 or the fourth valve 4, or directs the coolant passing through the first connection unit 98 to the battery 92. The fifth valve 5 is a three-way valve.

That is, the fifth valve 5 includes a first connector 51, a second connector 52, and a third connector 53. The first connector 51 is connected to the battery 92, and the second connector 52 is connected to the first connection unit 98, and the third connector 53 is connected to the fourth valve 4. The coolant passing through the battery 92 is introduced into the first connector 51 and is discharged through the second connector 52 or the third connector 53. Additionally, the coolant passing through the first connection unit 98 is introduced into the second connector 52 and is discharged through the first connector 51.

Hereinafter, referring to FIGS. 3 to 16, operation examples of each air conditioning mode will be described in more detail.

Figure 3:
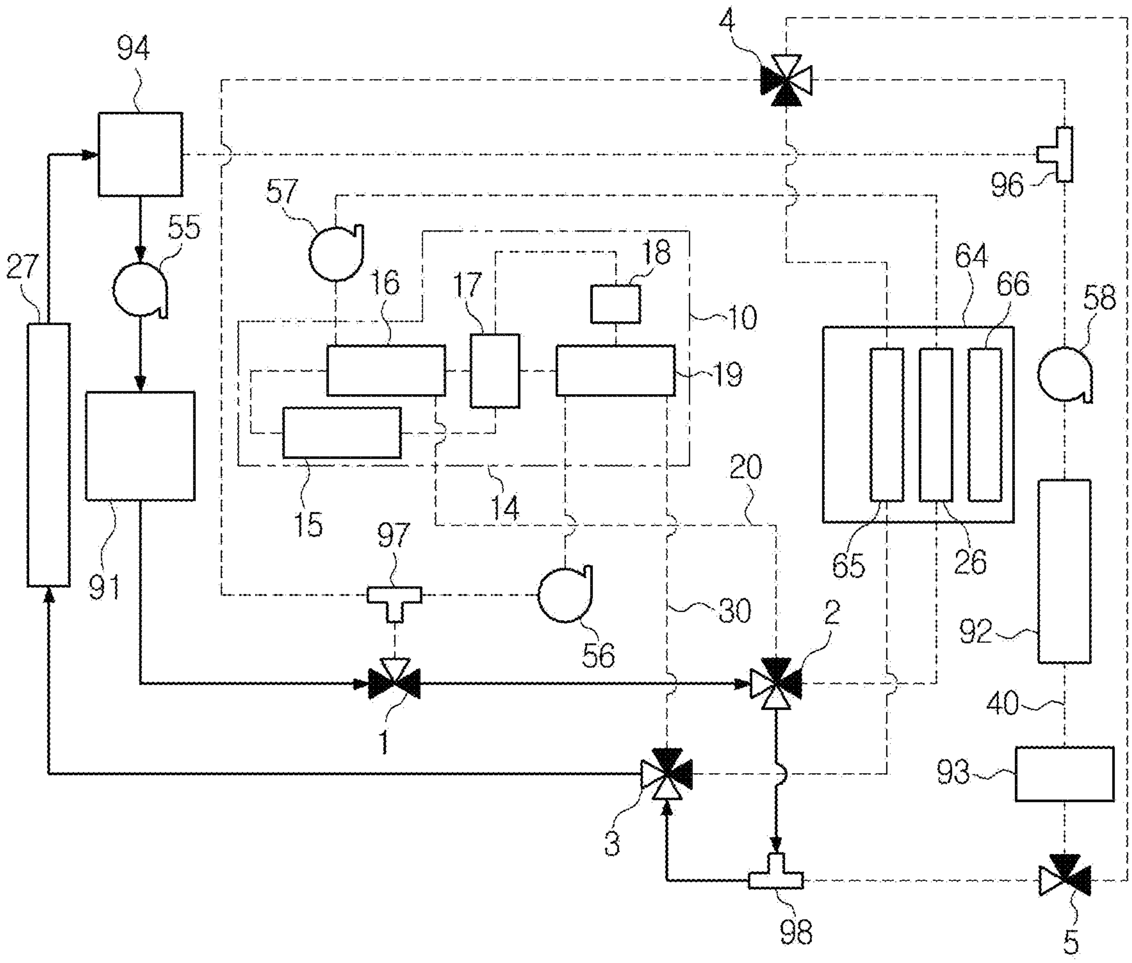
FIG. 3 illustrates a first operation mode of the vehicle thermal management system according to an embodiment of the present invention.
Figure 3:
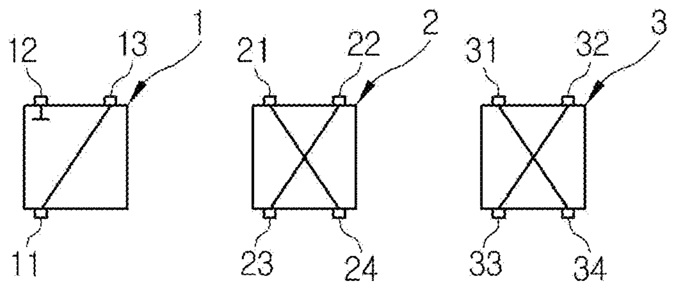

Referring to FIG. 3, the first operation mode is an electric components cooling mode using outdoor air. The first valve 1 connects the electric components 91 to the second valve 2. The second valve 2 connects the first valve 1 to the first connection unit 98. The third valve 3 connects the first connection unit 98 to the radiator 27.

The refrigerant flow in the refrigerant module 10 is stopped. Moreover, interior cooling and heating through the cooling heat exchanger 65 and the heating heat exchanger 26 do not operate. The coolant passing through the electric components 91 sequentially passes through the first valve 1, the second valve 2, the first connection unit 98, the third valve 3, the radiator 27, the reservoir tank 94, and the fourth water pump 55, and then, circulates through the electric components 91. The heat of the electric components 91 is cooled through the outdoor air. In this mode, cooling of the battery 92 does not occur.

Figure 4:
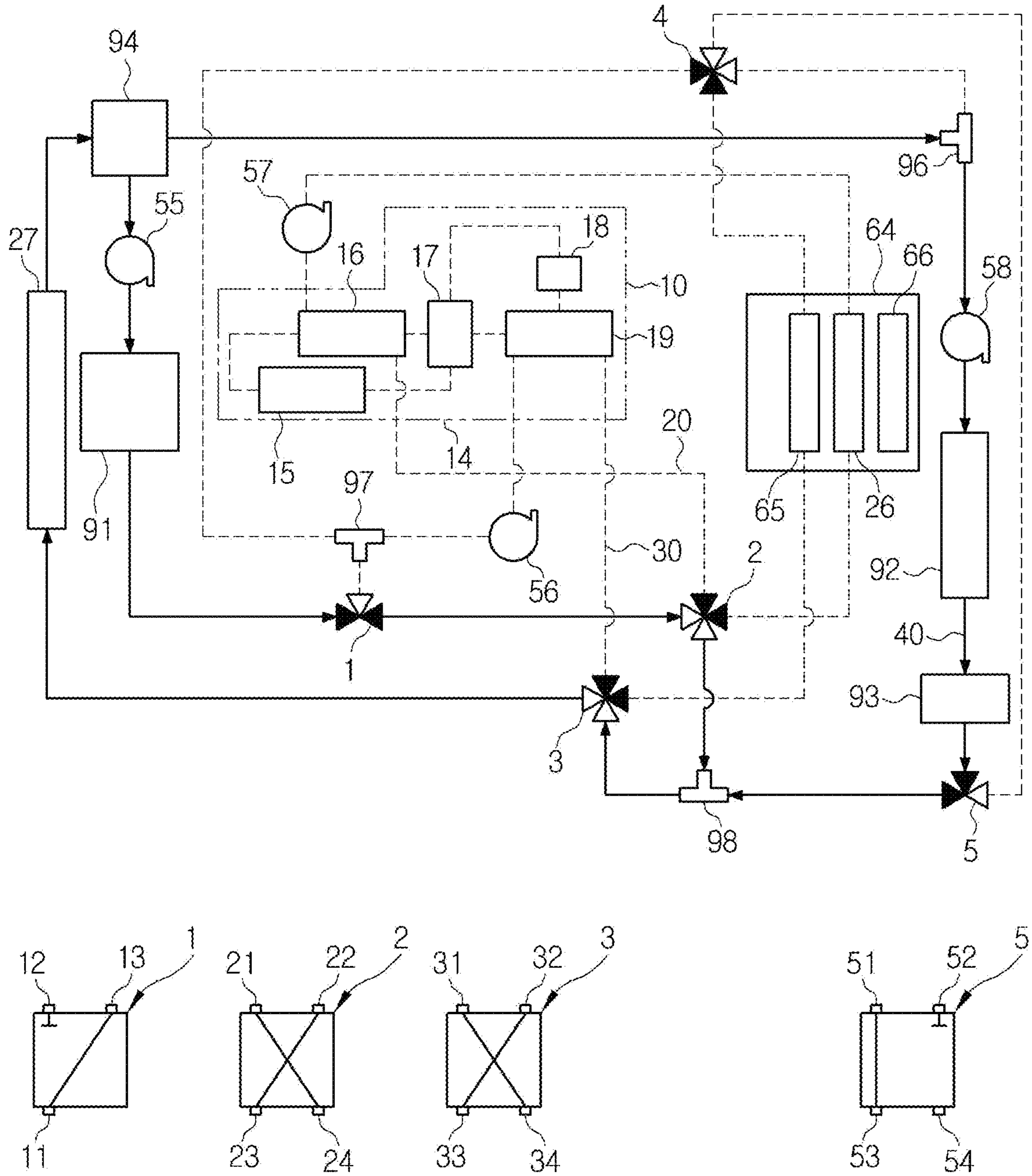
FIG. 4 illustrates a second operation mode of the vehicle thermal management system according to an embodiment of the present invention.

Referring to FIG. 4, the second operation mode is a simultaneous cooling mode for the electric components and the battery using the outdoor air. The first valve 1 connects the electric components 91 to the second valve 2. The second valve 2 connects the first valve 1 to the first connection unit 98. The third valve 3 connects the first connection unit 98 to the radiator 27. The fifth valve 5 connects the battery 92 to the first connection unit 98.

The refrigerant flow in the refrigerant module 10 is stopped. Additionally, interior cooling and heating through the cooling heat exchanger 65 and the heating heat exchanger 26 do not operate. Furthermore, the coolant flow in the first coolant line 20 and the second coolant line 30 is stopped. Additionally, the coolant sequentially passes through the battery 92, the fifth valve 5, the first connection unit 98, the third valve 3, and the radiator 27.

In this case, a portion of the coolant passing through the radiator 27 circulates through the battery 92, and another portion of the coolant sequentially passes through the electric components 91, the first valve 1, the second valve 2, the first connection unit 98, and the third valve 3, and then, recirculates through the radiator 27. The heat of the electric components 91 and the battery 92 is cooled through the outdoor air.

Figure 5:
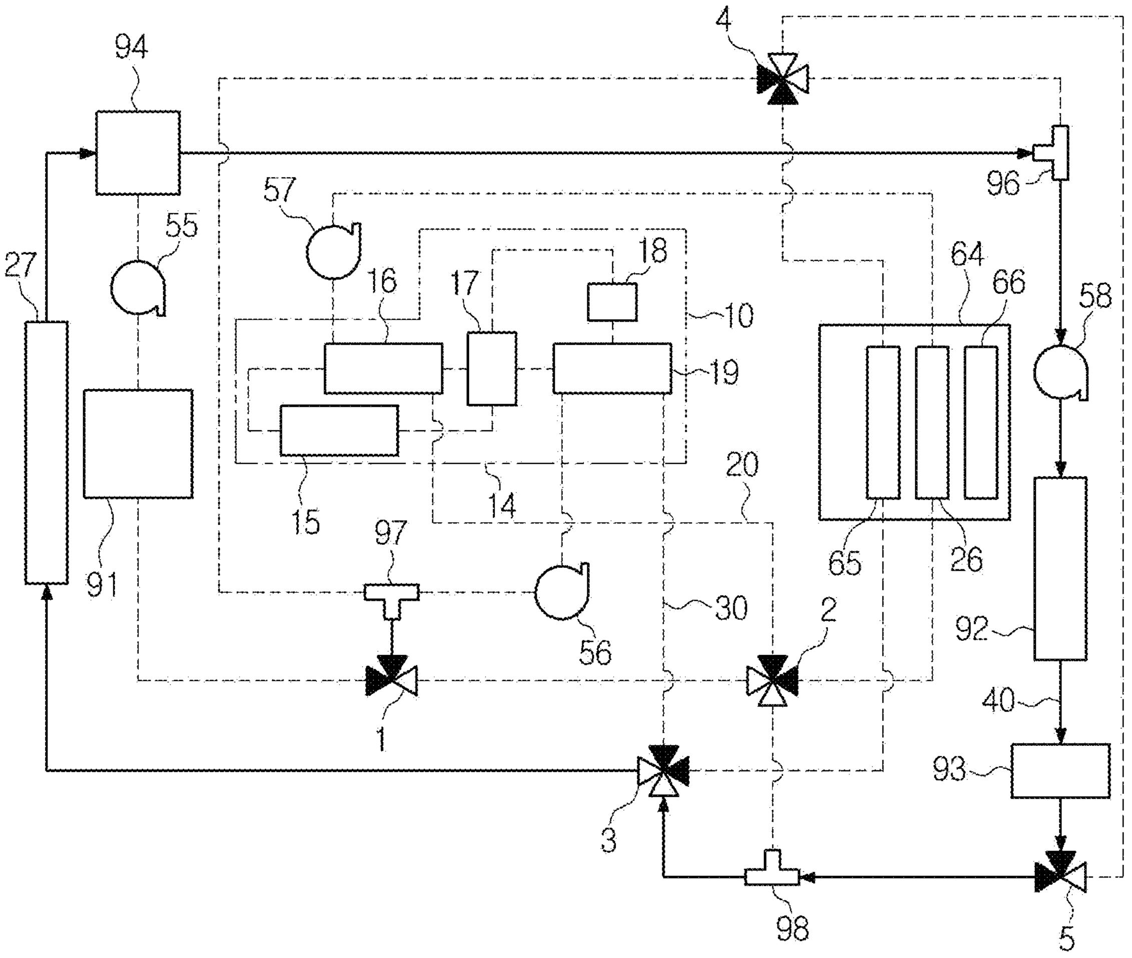
FIG. 5 illustrates a third operation mode of the vehicle thermal management system according to an embodiment of the present invention.
Figure 5:
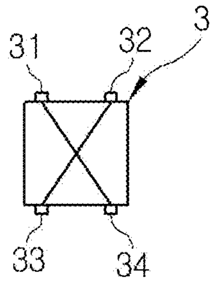
Figure 5:
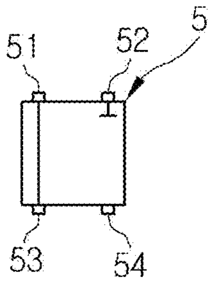

Referring to FIG. 5, the third operation mode is a battery cooling mode using outdoor air. The third valve 3 connects the first connection unit 98 to the radiator 27. The fifth valve 5 connects the battery 92 to the first connection unit 98. The refrigerant flow in the refrigerant module 10 is stopped. Furthermore, interior cooling and heating through the cooling heat exchanger 65 and the heating heat exchanger 26 do not operate.

Additionally, the coolant flow in both the first coolant line 20 and the second coolant line 30 is stopped. The coolant passing through the battery 92 sequentially passes through the coolant heater 93, the fifth valve 5, the first connection unit 98, the third valve 3, the radiator 27, the reservoir tank 94, the third connection unit 96, and the third water pump 58, and then, circulates through the battery 92. The heat of the battery 92 is cooled through the outdoor air. In this mode, the cooling of the electric components 91 does not occur.

Figure 6:
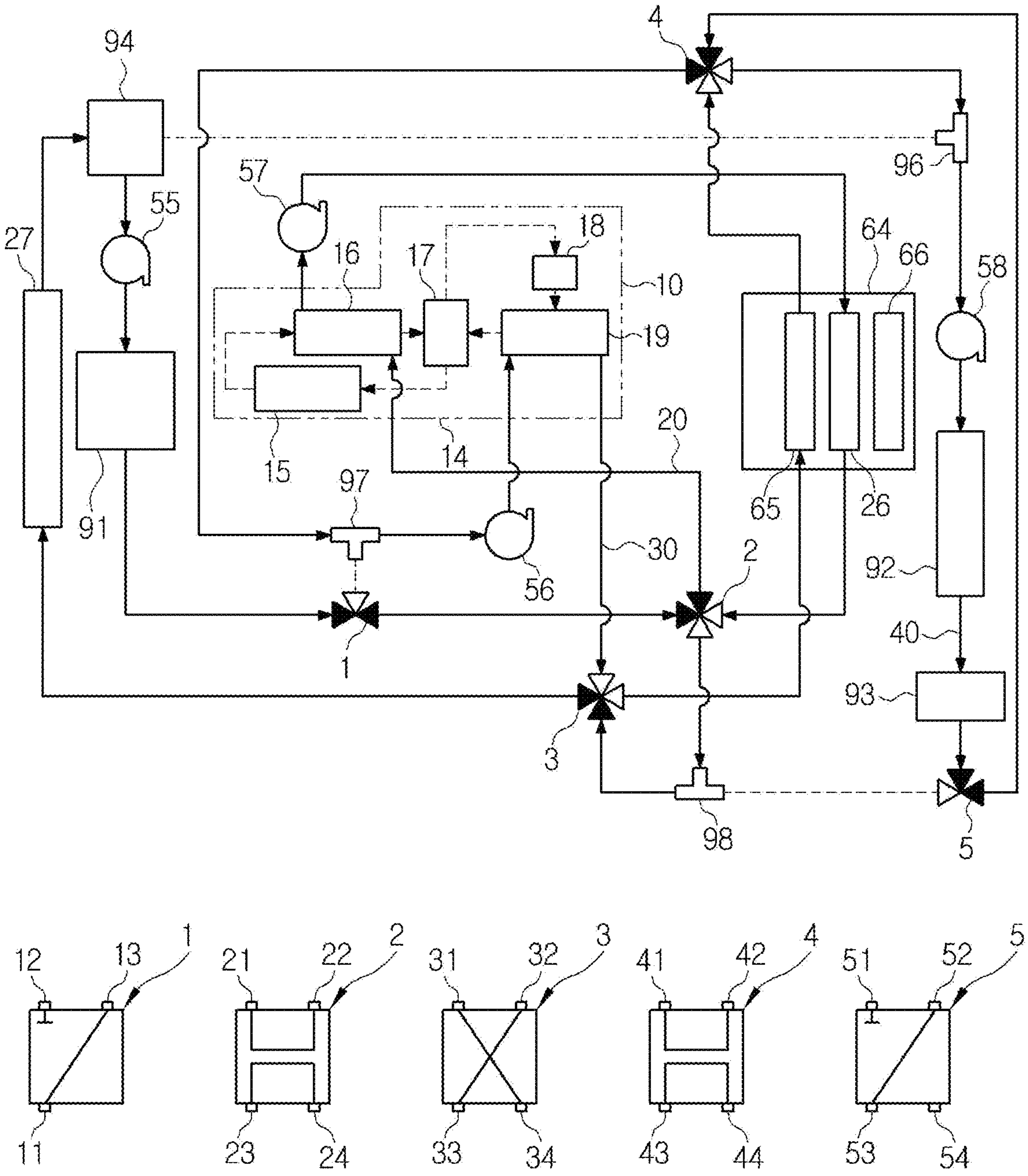
FIG. 6 illustrates a fourth operation mode of the vehicle thermal management system according to an embodiment of the present invention.

Referring to FIG. 6, the fourth operation mode is a battery rapid cooling mode. The first valve 1 connects the electric components 91 to the second valve 2. The second valve 2 connects the first valve 1 to the condenser 16, and connects the heating heat exchanger 26 to the first connection unit 98. The third valve 3 connects the first connection unit 98 to the radiator 27, and connects the chiller 19 to the cooling heat exchanger 65. The fourth valve 4 connects the fifth valve 5 to the chiller 19, and connects the cooling heat exchanger 65 to the battery 92. The fifth valve 5 connects the battery 92 to the fourth valve 4.

The refrigerant in the refrigerant line 14 sequentially circulates through the compressor 15, the condenser 16, the expansion valve 18, and the chiller 19. The coolant passing through the battery 92 sequentially circulates through the fifth valve 5, the fourth valve 4, the chiller 19, the third valve 3, the cooling heat exchanger 65, the fourth valve 4, and the battery 92. In this case, although the interior cooling and heating through the cooling heat exchanger 65 and the heating heat exchanger 26 do not operate, individual operation via the on/off control of an air blower is possible. The heat of the battery 92 is cooled through the refrigerant.

Figure 7:
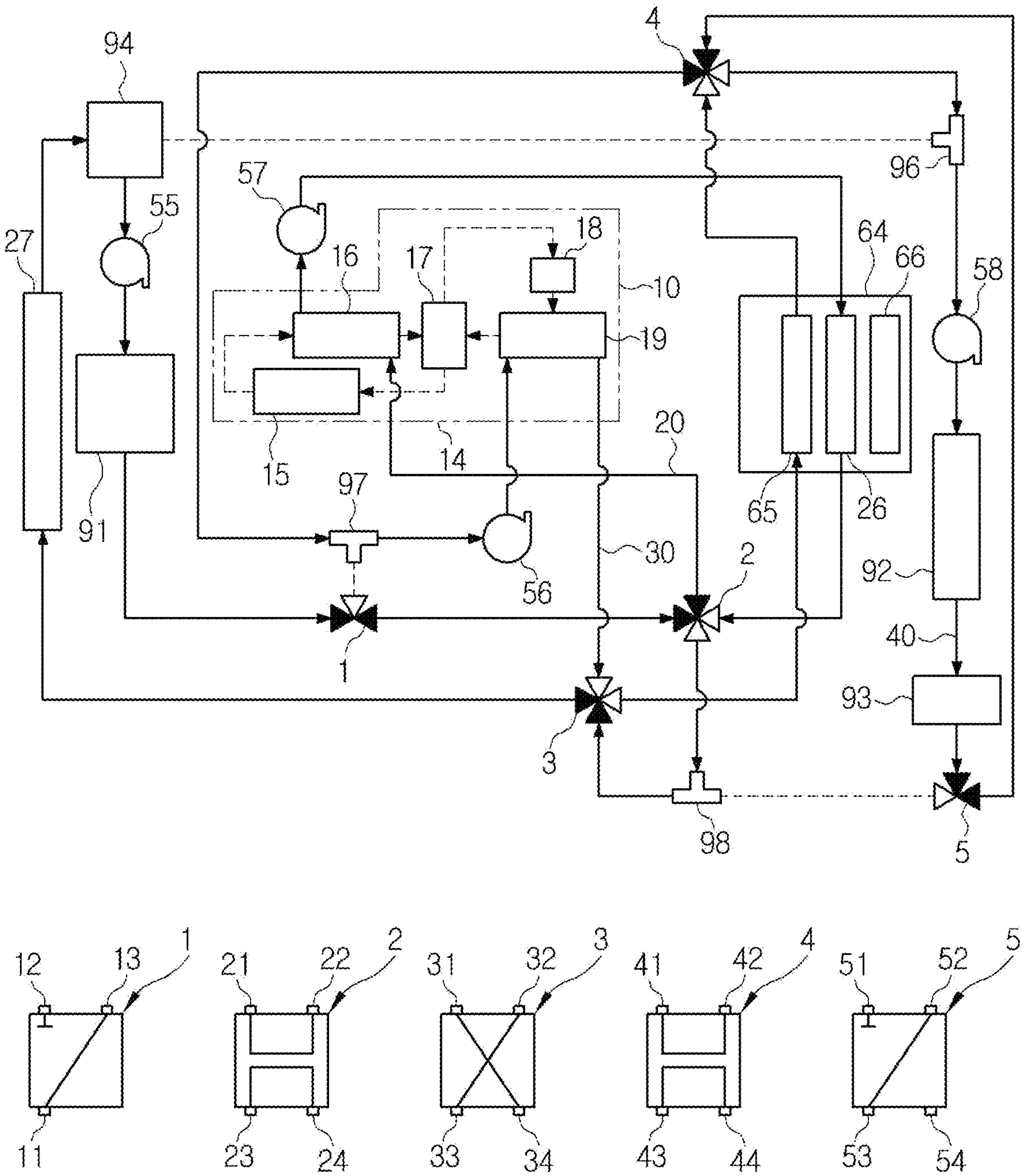
FIG. 7 illustrates a fifth operation mode of the vehicle thermal management system according to an embodiment of the present invention.

Referring to FIG. 7, the fifth operation mode is the cooling mode and a battery cooling mode using the refrigerant. The first valve 1 connects the electric components 91 to the second valve 2. The second valve 2 connects the first valve 1 to the condenser 16 and connects the heating heat exchanger 26 to the first connection unit 98. The third valve 3 connects the first connection unit 98 to the radiator 27 and connects the chiller 19 to the cooling heat exchanger 65. The fourth valve 4 connects the fifth valve 5 to the chiller 19 and connects the cooling heat exchanger 65 to the battery 92. The fifth valve 5 connects the battery 92 to the fourth valve 4.

The refrigerant in the refrigerant line 14 sequentially circulates through the compressor 15, the condenser 16, the expansion valve 18, and the chiller 19. The coolant passing through the battery 92 sequentially circulates through the coolant heater 93, the fifth valve 5, the fourth valve 4, the second connection unit 97, the second water pump 56, the chiller 19, the third valve 3, the cooling heat exchanger 65, the fourth valve 4, the third connection unit 96, the third water pump 58, and the battery 92. The cooling heat exchanger 65 exchanges heat with the air inside the air conditioning case 64 to cool the interior. The heat of the electric components 91 is cooled through the outdoor air, and the heat of the battery 92 is cooled through the refrigerant.

Figure 8:
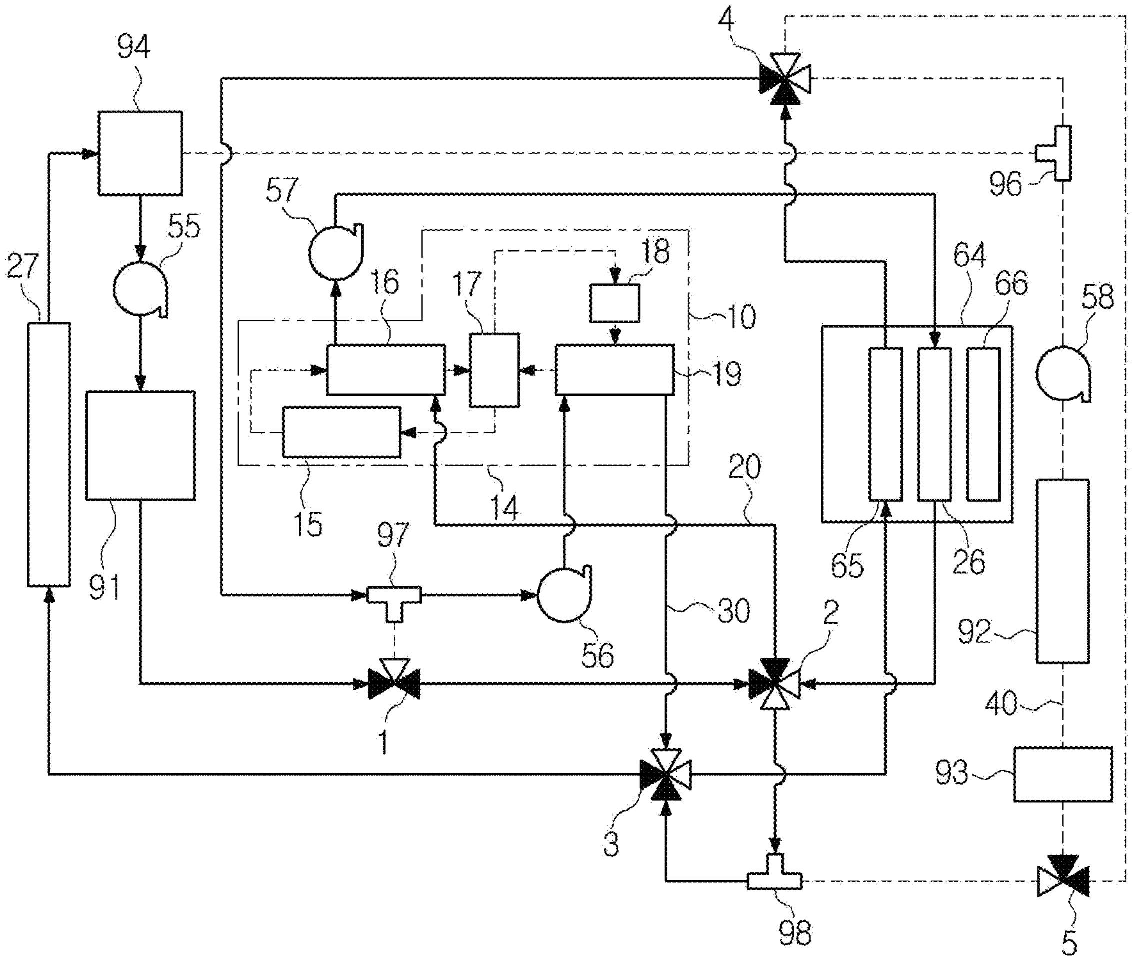
FIG. 8 illustrates a sixth operation mode of the vehicle thermal management system according to an embodiment of the present invention.
Figure 8:
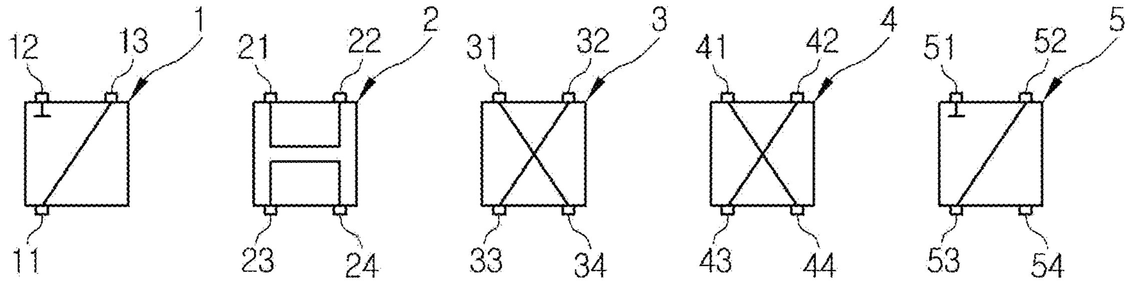

Referring to FIG. 8, the sixth operation mode is the cooling mode. The first valve 1 connects the electric components 91 to the second valve 2. The second valve 2 connects the first valve 1 to the condenser 16 and connects the heating heat exchanger 26 to the first connection unit 98. The third valve 3 connects the first connection unit 98 to the radiator 27 and connects the chiller 19 to the cooling heat exchanger 65. The fourth valve 4 connects the cooling heat exchanger 65 to the chiller 19.

The refrigerant in the refrigerant line 14 sequentially circulates through the compressor 15, the condenser 16, the expansion valve 18, and the chiller 19. The coolant passing through the cooling heat exchanger 65 sequentially passes through the fourth valve 4, the second connection unit 97, the second water pump 56, the chiller 19, and the third valve 3, and then, circulates through the cooling heat exchanger 65. The cooling heat exchanger 65 exchanges heat with the air inside the air conditioning case 64 to cool the interior. The heat of the electric components 91 is cooled through the outdoor air, but the heat of the battery 92 is not cooled.

Figure 9:
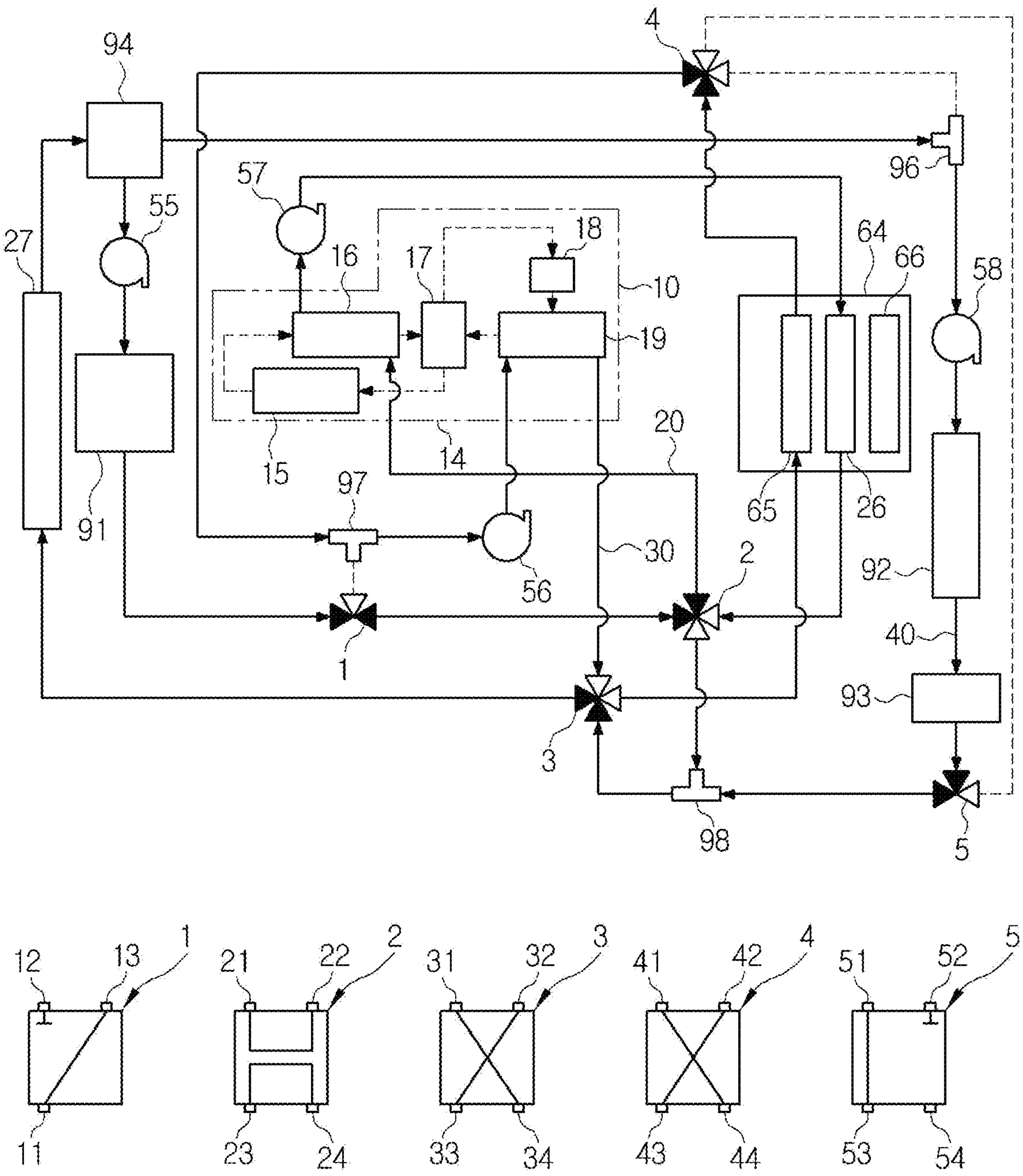
FIG. 9 illustrates a seventh operation mode of the vehicle thermal management system according to an embodiment of the present invention.

Referring to FIG. 9, the seventh operation mode is the cooling mode and the battery cooling mode through the outdoor air. The first valve 1 connects the electric components 91 to the second valve 2. The second valve 2 connects the first valve 1 to the condenser 16 and connects the heating heat exchanger 26 to the first connection unit 98. The third valve 3 connects the first connection unit 98 to the radiator 27 and connects the chiller 19 to the cooling heat exchanger 65. The fourth valve 4 connects the cooling heat exchanger 65 to the chiller 19. The fifth valve 5 connects the battery 92 to the first connection unit 98.

Meanwhile, the refrigerant in the refrigerant line 14 sequentially circulates through the compressor 15, the condenser 16, the expansion valve 18, and the chiller 19. The coolant passing through the cooling heat exchanger 65 sequentially passes through the fourth valve 4, the second connection unit 97, the second water pump 56, the chiller 19, and the third valve 3, and then, circulates through the cooling heat exchanger 65. Additionally, a portion of the coolant passing through the radiator 27 sequentially passes through the reservoir tank 94, the third connection unit 96, the third water pump 58, the battery 92, the coolant heater 93, the fifth valve 5, the first connection unit 98, and the third valve 3, and then, circulates through the radiator 27.

Another portion of the coolant passing through the radiator 27 sequentially passes through the reservoir tank 94, the fourth water pump 55, the electric components 91, the first valve 1, the second valve 2, the condenser 16, the first water pump 57, the heating heat exchanger 26, the second valve 2, the first connection unit 98, and the third valve 3, and then, circulates through the radiator 27. The cooling heat exchanger 65 exchanges heat with the air to cool inside the air conditioning case 64 to cool the interior. The heat of the electric components 91 is cooled through the outdoor air. The heat of the battery 92 is also cooled through the outdoor air.

Figure 10:
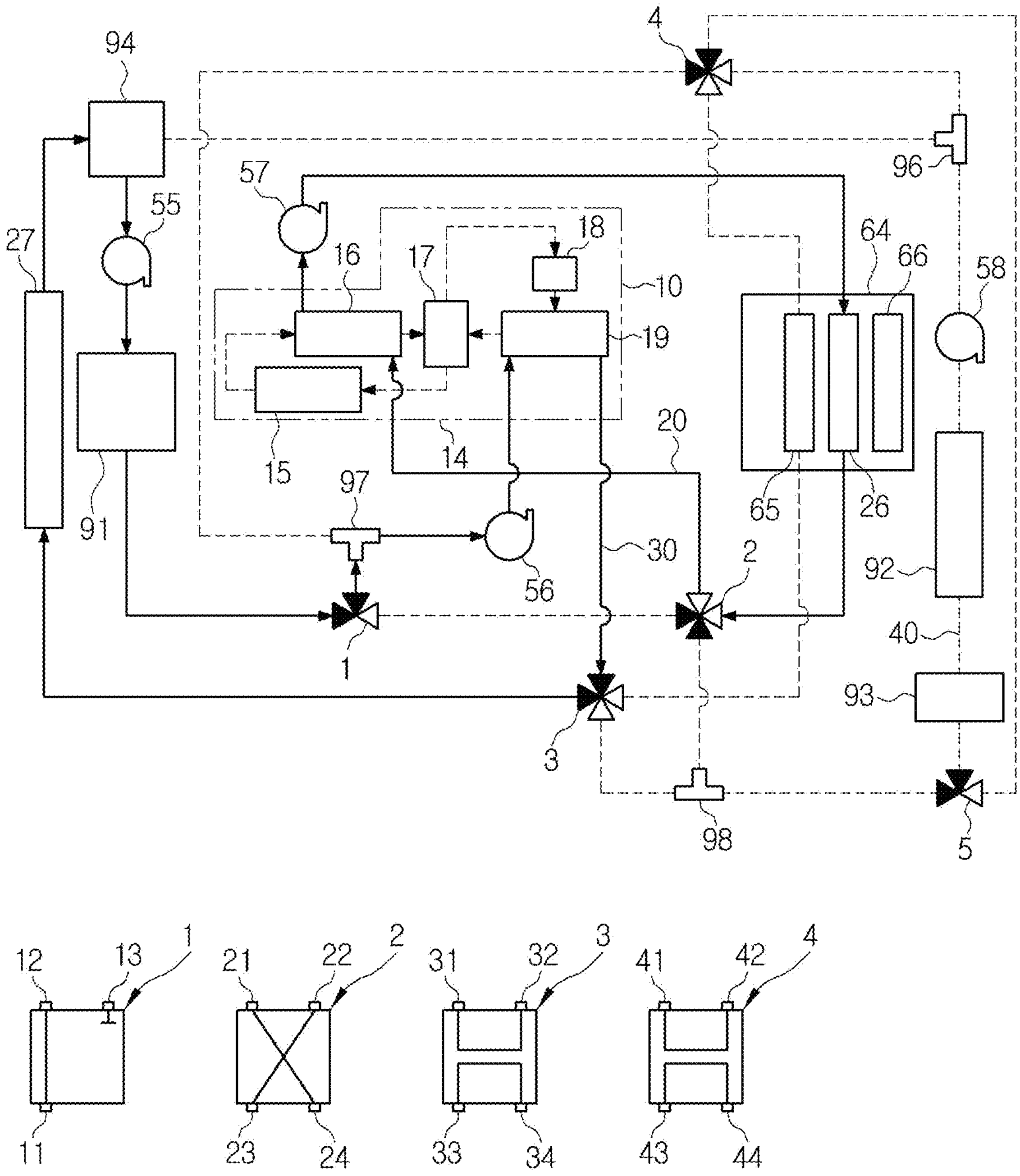
FIG. 10 illustrates an eighth operation mode of the vehicle thermal management system according to an embodiment of the present invention.

Referring to FIG. 10, the eighth operation mode is a heating mode absorbing heat from the outdoor air and the electric components. The first valve 1 connects the electric components 91 to the second connection unit 97. The second valve 2 connects the heating heat exchanger 26 to the condenser 16. The third valve 3 connects the chiller 19 to the radiator 27. The refrigerant in the refrigerant line 14 sequentially circulates through the compressor 15, the condenser 16, the expansion valve 18, and the chiller 19. The heating heat exchanger 26 exchanges heat with the air inside the air conditioning case 64 to warm the interior.

The coolant passing through the heating heat exchanger 26 sequentially passes through the second valve 2 and the condenser 16, and then, circulates through the heating heat exchanger 26. Additionally, the coolant passing through the radiator 27 sequentially passes through the reservoir tank 94, the fourth water pump 55, the electric components 91, the first valve 1, the second connection unit 97, the second water pump 56, the chiller 19, and the third valve 3, and then, circulates through the radiator 27. The coolant absorbs heat in the radiator 27 and the electric components 91.

Figure 11:
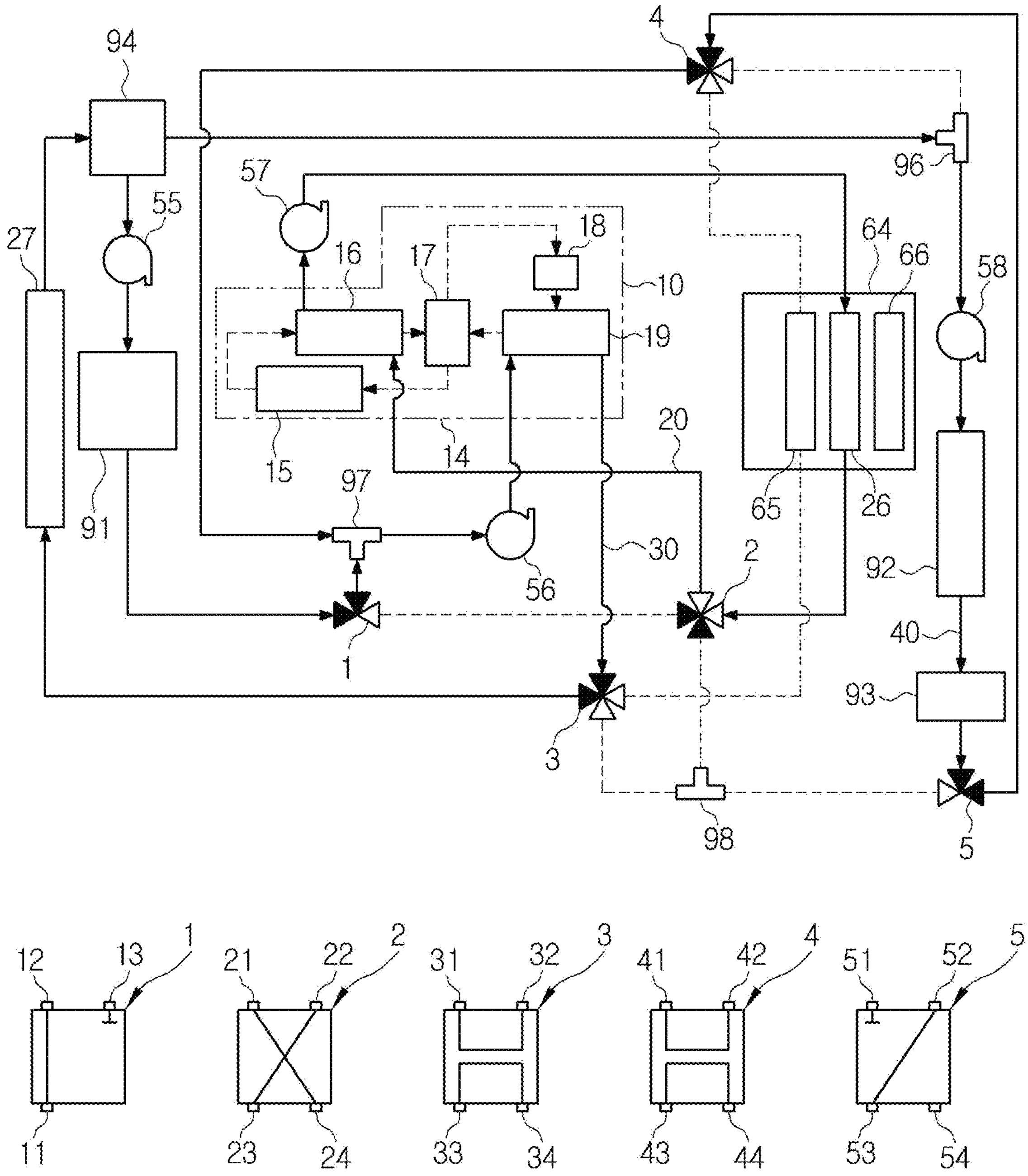
FIG. 11 illustrates a ninth operation mode of the vehicle thermal management system according to an embodiment of the present invention.

Referring to FIG. 11, the ninth operation mode is a heating mode that absorbs heat from the outdoor air, the electric components, and the battery. The first valve 1 connects the electric components 91 to the second connection unit 97. The second valve 2 connects the heating heat exchanger 26 to the condenser 16. The third valve 3 connects the chiller 19 to the radiator 27. The fourth valve 4 connects the fifth valve 5 to the chiller 19. The fifth valve 5 connects the battery 92 to the fourth valve 4.

The refrigerant in refrigerant line 14 sequentially circulates through the compressor 15, the condenser 16, the expansion valve 18, and the chiller 19. The heating heat exchanger 26 exchanges heat with the air inside air conditioning case 64 to heat the interior. The coolant passing through heating heat exchanger 26 sequentially circulates through the second valve 2 and the condenser 16, and then, circulates through heating heat exchanger 26.

In addition, a portion of the coolant passing through radiator 27 sequentially passes through the reservoir tank 94, the fourth water pump 55, the electric components 91, the first valve 1, the second connection unit 97, the second water pump 56, the chiller 19, and the third valve 3, and then, circulates through the radiator 27. Another portion of the coolant passing through radiator 27 sequentially passes through the reservoir tank 94, the third connection unit 96, the third water pump 58, the battery 92, the coolant heater 93, the fifth valve 5, the fourth valve 4, the second connection unit 97, the second water pump 56, the chiller 19, and the third valve 3, and then circulates through the radiator 27.

The coolant absorbs heat from the radiator 27, the electric components 91, and the battery 92.

Figure 12:
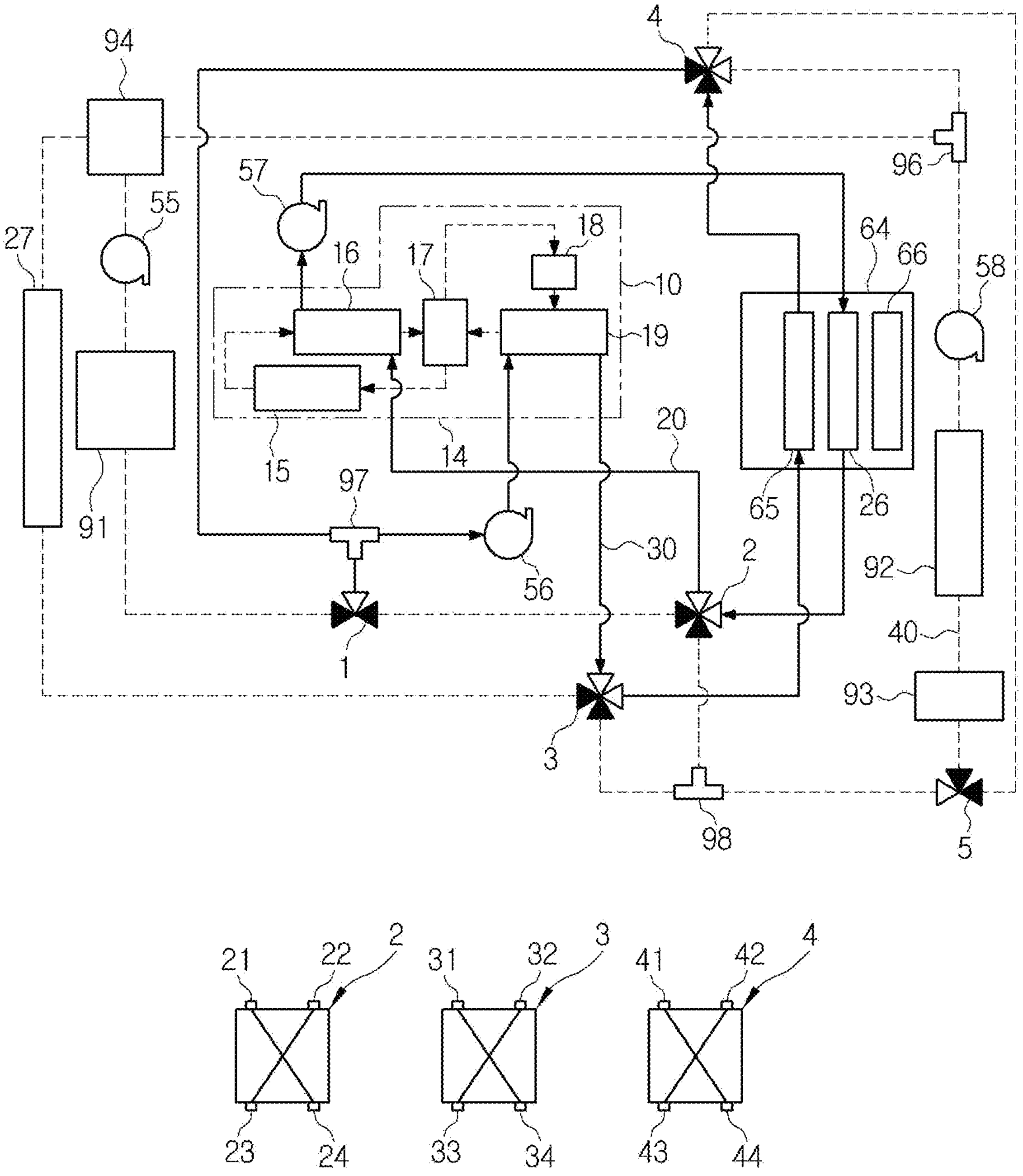
FIG. 12 illustrates a tenth operation mode of the vehicle thermal management system according to an embodiment of the present invention.

Referring to FIG. 12, the tenth operation mode is the heating mode and a dehumidification mode. The second valve 2 connects the heating heat exchanger 26 to the condenser 16. The third valve 3 connects the chiller 19 to the cooling heat exchanger 65. The fourth valve 4 connects the cooling heat exchanger 65 to the chiller 19. The refrigerant in the refrigerant line 14 sequentially circulates through the compressor 15, the condenser 16, the expansion valve 18, and the chiller 19.

Inside the air conditioning case 64, the heating heat exchanger 26 exchanges heat with the air to heat the interior, and the cooling heat exchanger 65 exchanges heat with the air to dehumidify the interior. The coolant passing through the heating heat exchanger 26 sequentially circulates through the second valve 2, the condenser 16, and the first water pump 57, and then, circulates through the heating heat exchanger 26. Additionally, the coolant passing through the cooling heat exchanger 65 circulates sequentially through the fourth valve 4, the second connection unit 97, the second water pump 56, the chiller 19, and the third valve 3 back to the cooling heat exchanger 65. There is no heat exchange involving the electric components 91 or the battery 92.

Figure 13:
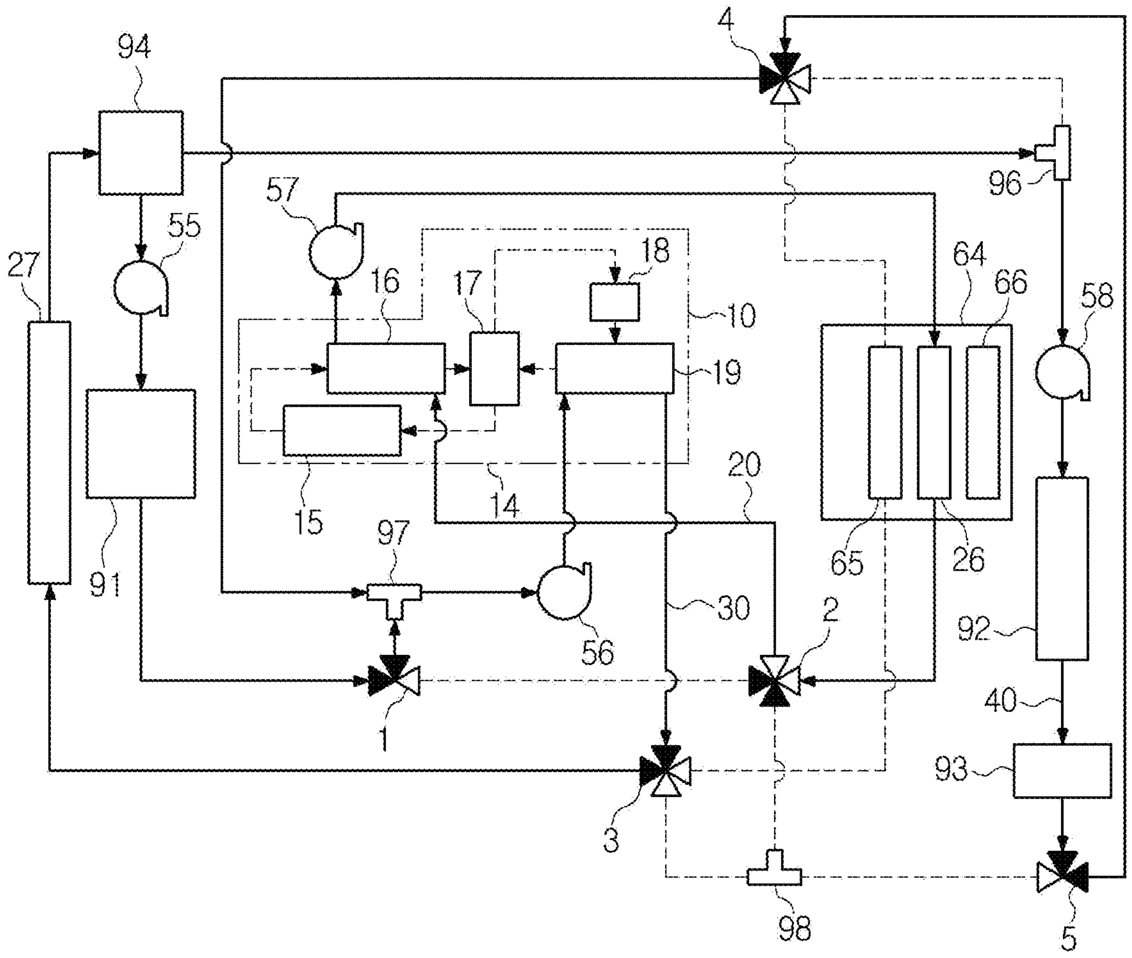
FIG. 13 illustrates an eleventh operation mode of the vehicle thermal management system according to an embodiment of the present invention.
Figure 13:
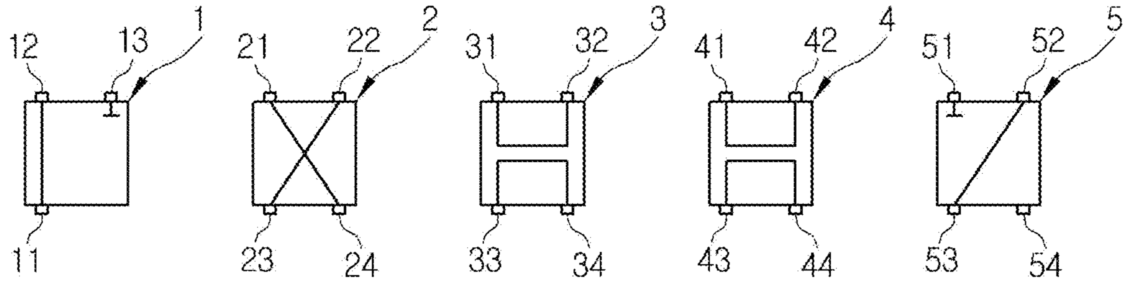

Referring to FIG. 13, the eleventh operation mode is a heating and dehumidification mode that absorbs heat from the outdoor air, the electric components, and the battery. The first valve 1 connects the electric components 91 to the second connection unit 97. The second valve 2 connects the heating heat exchanger 26 to the condenser 16. The third valve 3 connects the chiller 19 to the radiator 27. The fourth valve 4 connects the fifth valve 5 to the chiller 19. The fifth valve 5 connects the battery 92 to the fourth valve 4.

The refrigerant in the refrigerant line 14 sequentially circulates through the compressor 15, the condenser 16, the expansion valve 18, and the chiller 19. Inside the air conditioning case 64, the heating heat exchanger 26 exchanges heat with the air to heat the interior, and the cooling heat exchanger 65 exchanges heat with the air to dehumidify the interior. The coolant passing through the heating heat exchanger 26 sequentially circulates through the second valve 2, the condenser 16, and the first water pump 57, and then, circulates through the heating heat exchanger 26.

In addition, a portion of the coolant passing through the radiator 27 sequentially passes through the reservoir tank 94, the fourth water pump 55, the electric components 91, the first valve 1, the second connection unit 97, the second water pump 56, the chiller 19, and the third valve 3, and then, circulates through the radiator 27. Another portion of the coolant passing through the radiator 27 sequentially passes through the reservoir tank 94, the third connection unit 96, the third water pump 58, the battery 92, the coolant heater 93, the fifth valve 5, the fourth valve 4, the second connection unit 97, the second water pump 56, the chiller 19, and the third valve 3, and then, circulates through the radiator 27. The coolant absorbs heat in the radiator 27, the electric components 91, and the battery 92.

Figure 14:
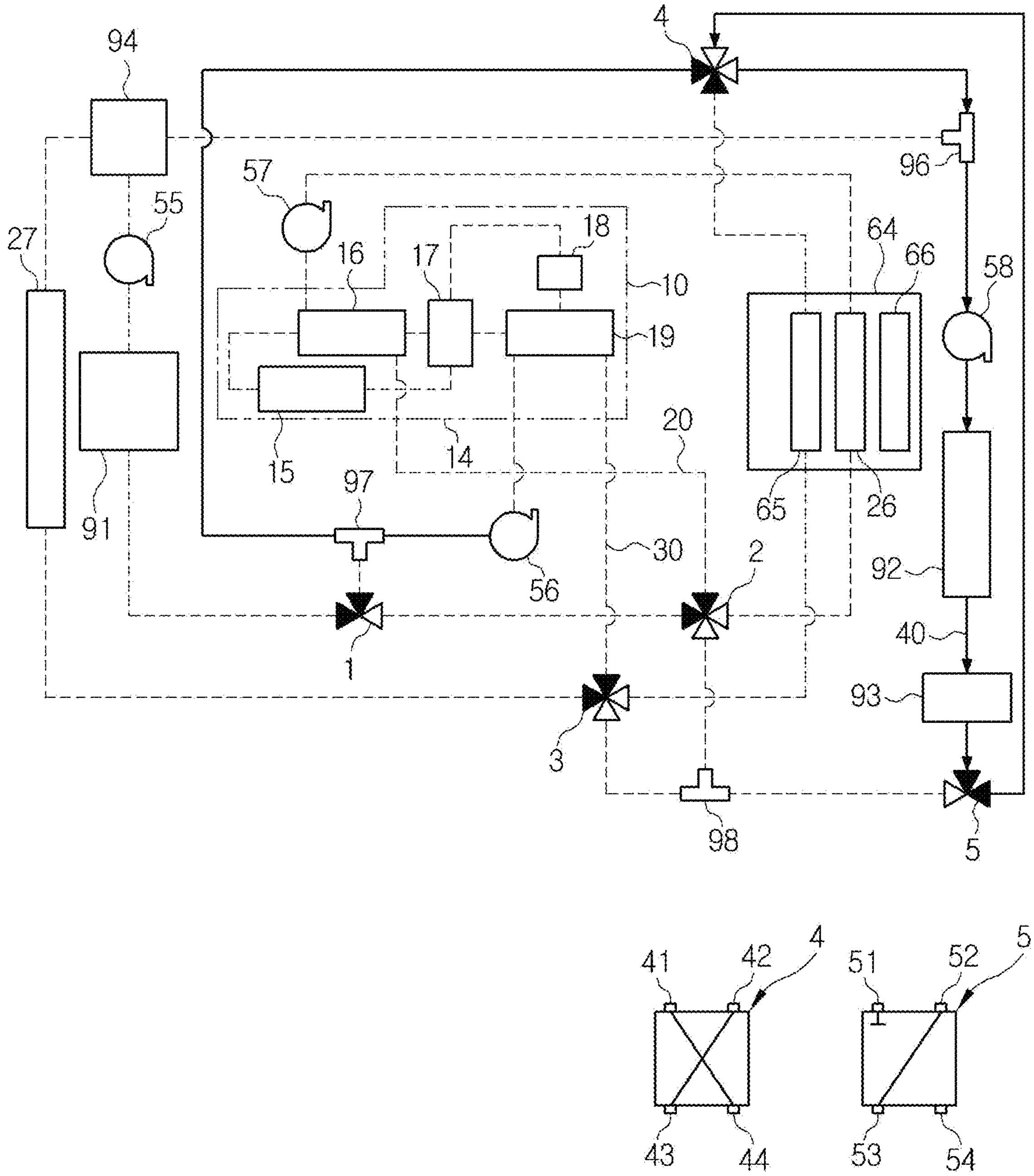
FIG. 14 illustrates a twelfth operation mode of the vehicle thermal management system according to an embodiment of the present invention.

Referring to FIG. 14, the twelfth operation mode is a battery temperature rising mode through the coolant heater. The fourth valve 4 connects the fifth valve 5 and the battery 92. The fifth valve 5 connects the battery 92 and the fourth valve 4. The flow of the refrigerant in the refrigerant module 10 is stopped. Additionally, interior cooling and heating through the cooling heat exchanger 65 and the heating heat exchanger 26 do not operate. Furthermore, the coolant flow in the first coolant line 20 and the second coolant line 30 is stopped.

The coolant passing through the battery 92 sequentially passes through the coolant heater 93, the fifth valve 5, the fourth valve 4, the third connection unit 96, and the third water pump 58, and then, circulates through the battery 92. The coolant is heated in the coolant heater 93, and the battery 92 is heated by the heated coolant passing through the battery 92.

Figure 15:
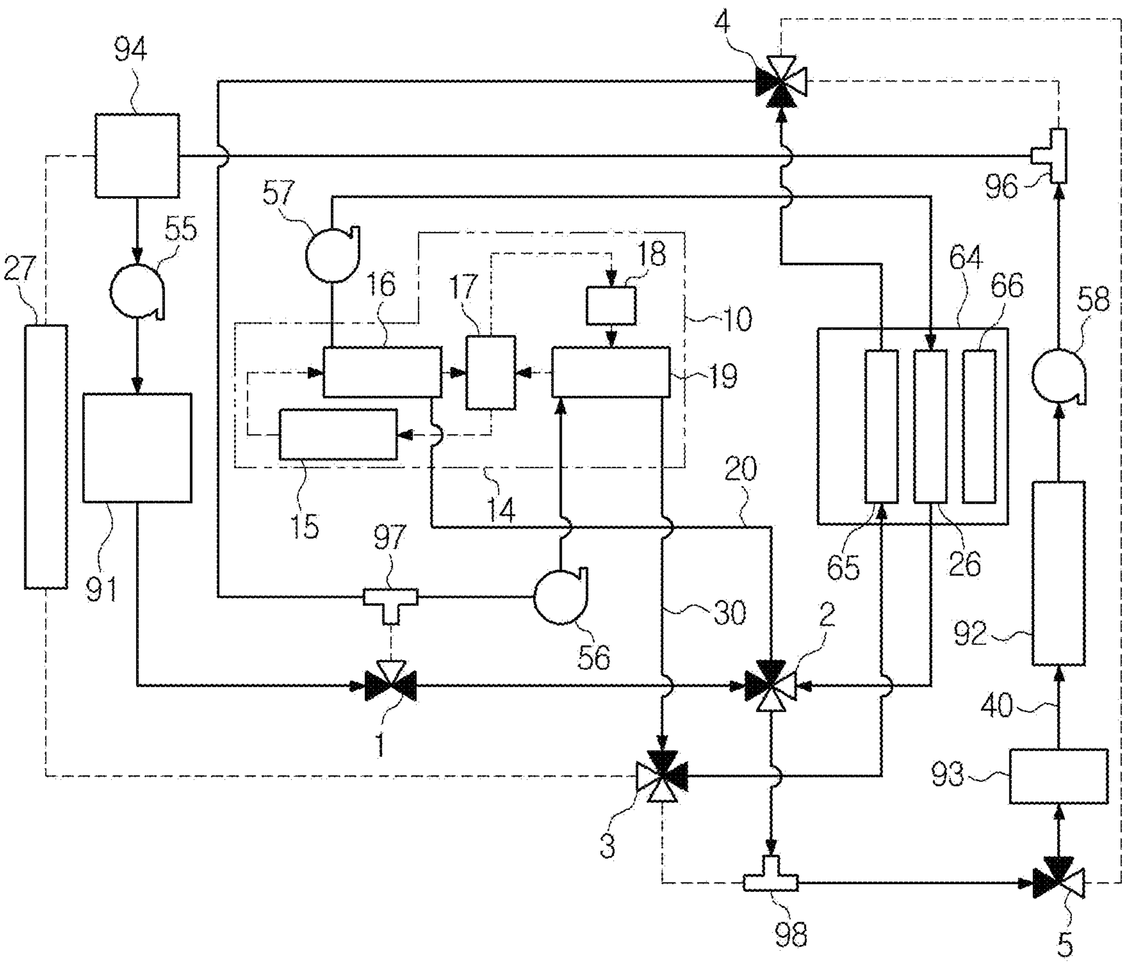
FIG. 15 illustrates a thirteenth operation mode of the vehicle thermal management system according to an embodiment of the present invention.
Figure 15:
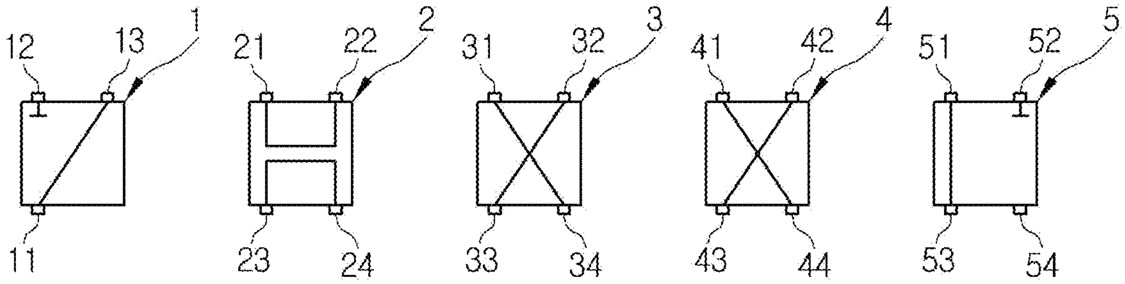

Referring to FIG. 15, the thirteenth operation mode is a battery temperature rising mode through a heat pump. The first valve 1 connects the electric components 91 to the second valve 2. The second valve 2 connects the first valve 1 to the condenser 16 and connects the heating heat exchanger 26 to the first connection unit 98. The third valve 3 connects the chiller 19 to the cooling heat exchanger 65. The fourth valve 4 connects the cooling heat exchanger 65 to the chiller 19. The fifth valve 5 connects the first connection unit 98 to the battery 92.

The refrigerant in the refrigerant line 14 sequentially circulates through the compressor 15, the condenser 16, the expansion valve 18, and the chiller 19. Moreover, interior cooling and heating through the cooling heat exchanger 65 and the heating heat exchanger 26 do not operate. The coolant passing through the battery 92 sequentially circulates through the third water pump 58, the third connection unit 96, the reservoir tank 94, the fourth water pump 55, the electric components 91, the first valve 1, the second valve 2, the condenser 16, the first water pump 57, the heating heat exchanger 26, the second valve 2, the first connection unit 98, the fifth valve 5, and the coolant heater 93, and then, circulates through the battery 92.

In this case, there is no heat exchange in the electric components 91, and the coolant heater 93 does not operate. Finally, the battery 92 is heated through the heat (heat from the condenser) of the refrigerant. The temperature rise of the battery 92 through heat pump mode is possible, thereby enabling battery 92 temperature rise without the operation of the coolant heater 93.

Figure 16:
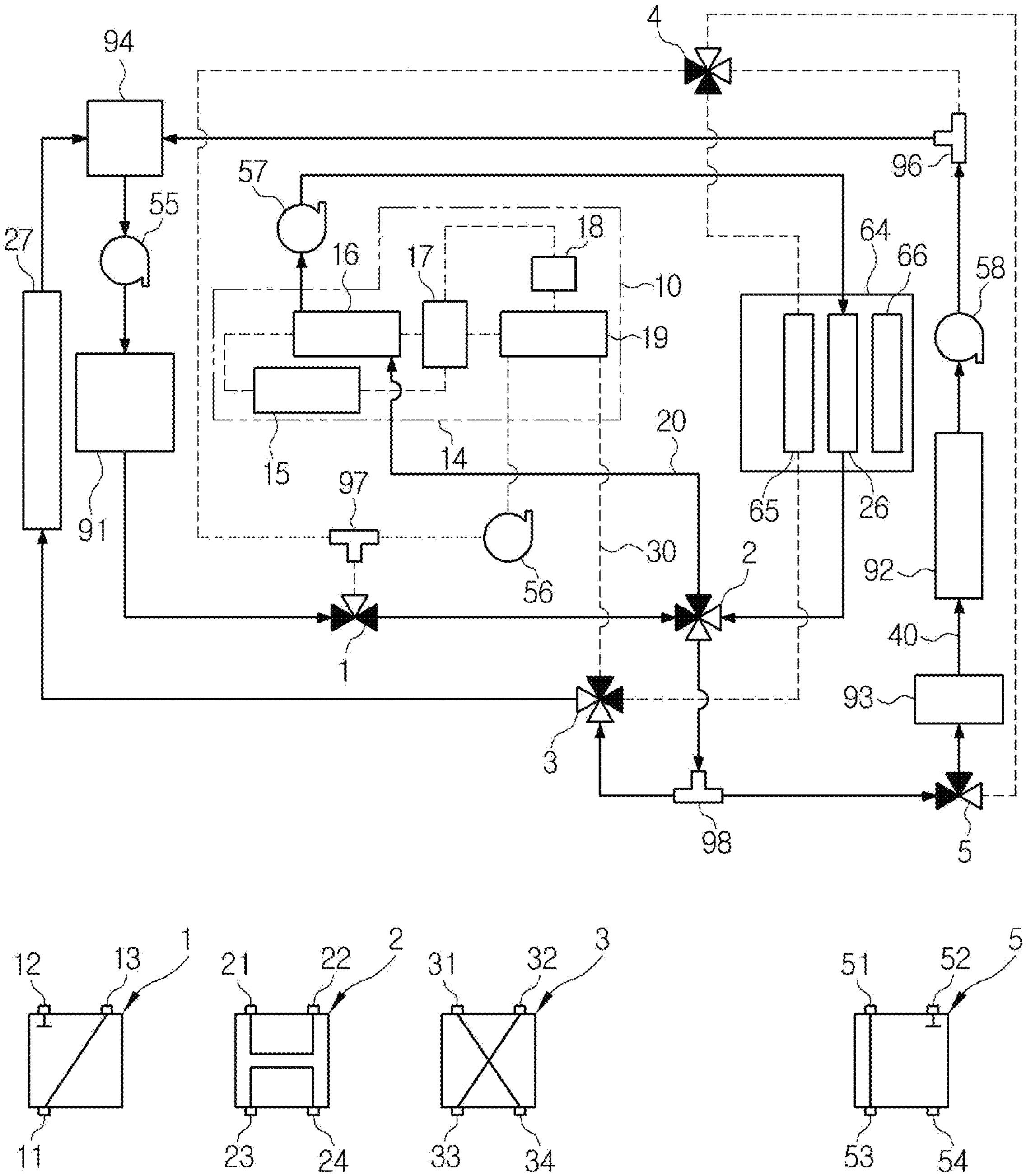
FIG. 16 illustrates a fourteenth operation mode of the vehicle thermal management system according to an embodiment of the present invention.

Referring to FIG. 16, the fourteenth operation mode is a heat absorption and heating mode. The first valve 1 connects the electric components 91 to the second valve 2. The second valve 2 connects the first valve 1 to the condenser 16 and connects the heating heat exchanger 26 to the first connection unit 98. The third valve 3 connects the first connection unit 98 to the radiator 27. The fifth valve 5 connects the first connection unit 98 to the battery 92.

The coolant passing through the heating heat exchanger 26 sequentially passes through the second valve 2 and the first connection unit 98. A portion of the coolant passing through the first connection unit 98 sequentially passes through the third valve 3, the radiator 27, the reservoir tank 94, the fourth water pump 55, the electric components 91, the first valve 1, the second valve 2, and the condenser 16, and then, circulates through the heating heat exchanger 26.

Another portion of the coolant passing through the first connection unit 98 sequentially passes through the fifth valve 5, the coolant heater 93, the battery 92, the third water pump 58, the third connection unit 96, the reservoir tank 94, the fourth water pump 55, the electric components 91, the first valve 1, the second valve 2, and the condenser 16, and then, circulates through the heating heat exchanger 26. Inside the air conditioning case 64, the heating heat exchanger 26 exchanges heat with the air to heat the interior. The electric components 91 and the battery 92 release heat and serve as heat sources for interior heating.

In the vehicle thermal management system according to the present invention, the refrigerant line 14 simply includes the compressor 15, the condenser 16, the expansion valve 18, and the chiller 19, and the coolant line includes the radiator 27, the electric components 91, the battery 92, the condenser 16, the chiller 19, the coolant valve part having five valves, and four water pumps.

Through the configuration, the vehicle thermal management system according to the present invention can provide an integrated thermal management system for an electric vehicle, which can perform cooling, heating, and dehumidification of the interior of the vehicle, cooling and heat absorption of the electric components, general cooling of the battery and rapid cooling of the battery during rapid charging, and temperature rise of the battery at low temperature. Additionally, the vehicle thermal management system can simultaneously perform the functions of interior cooling and battery cooling with a single chiller 19 part, and when the ambient temperature is lower than the set temperature for cooling the battery, can perform heat dissipation from the radiator 27 without operation of the chiller 19.

Moreover, the vehicle thermal management system according to the present invention can realize fourteen different operation modes with a very simple structure. Furthermore, the vehicle thermal management system according to the present invention can reduce power of the electric compressor through an active individual cooling system depending on the heat generation amount of the battery, minimize overcooling, and contribute to improvement of vehicle fuel efficiency. Additionally, the vehicle thermal management system according to the present invention enables a high-capacity rapid cooling system in response to rapid battery charging. Furthermore, the vehicle thermal management system according to the present invention can secure cost competitiveness by simplifying the refrigerant lines and reducing the number of heat exchangers and refrigerant valves. In addition, the vehicle thermal management system according to the present invention can perform interior heating using only the waste heat from the electric components and the battery, and raise the temperature of the battery through the heat pump, and minimize power consumption.

While the vehicle thermal management system according to the present invention has been described with reference to the illustrated embodiments, the descriptions are exemplary only, and it will be understood by those skilled in the art that various modifications and equivalents of the embodiments are possible. Therefore, the true technical protection scope should be defined by the technical spirit of the appended claims.

The invention claimed is:

1. A vehicle thermal management system comprising:

a refrigerant line circulating through a compressor, a condenser, an expansion valve, a chiller;

a cooling heat exchanger and a heating heat exchanger provided in an air conditioning case so as to cool air and heat air, respectively;

a first coolant line passing through the heating heat exchanger and exchanging heat with the condenser of the refrigerant line;

a second coolant line passing through the cooling heat exchanger and exchanging heat with the chiller of the refrigerant line;

a radiator enabling heat exchange between a coolant and outdoor air;

a third coolant line passing through the radiator and exchanging heat with a battery of a vehicle; and a coolant valve for controlling the flow of the coolant so that the coolant of the second coolant line flows through the chiller, the cooling heat exchanger, and the battery in series, wherein the coolant passing through the radiator selectively passes through electric components of the vehicle, wherein the coolant valve comprises:

a first valve which is located between the electric components, the chiller, and a second valve, and selectively directs the coolant passing through the electric components to the chiller or the second valve, wherein:

the second valve which is located between the first valve, the condenser, the heating heat exchanger, and the third coolant line, and selectively directs the coolant passing through the first valve to the condenser or the third coolant line, or selectively directs the coolant passing through the heating heat exchanger to the condenser or the third coolant line; and the third coolant line includes a first connection valve which connects the second valve and the third coolant line;

a third valve, which is located between the radiator, the chiller, the cooling heat exchanger, and the first connection valve, wherein the third valve selectively directs the coolant passing through the chiller to the cooling heat exchanger or the radiator, or selectively directs the coolant passing through the first connection valve to the radiator or the cooling heat exchanger; and a fourth valve which is located between the chiller, a fifth valve, the battery, and the cooling heat exchanger, and selectively directs the coolant passing through the cooling heat exchanger to the chiller or the battery, or selectively directs the coolant passing through the fifth valve to the chiller or the battery, wherein the fifth valve which is located between the battery, the first connection valve, and the fourth valve, and selectively directs the coolant passing through the battery to the first connection valve or the fourth valve, or directs the coolant passing through the first connection valve to the battery.

2. The vehicle thermal management system according to claim 1, wherein the second coolant line includes a second connection valve which connects the first valve to the second coolant line, and wherein the second connection valve is positioned between the fourth valve and the chiller.

3. The vehicle thermal management system according to claim 1, wherein the third coolant line includes a third connection valve which connects the radiator to the third coolant line, and wherein the third connection valve is positioned between the fourth valve and the battery.

4. The vehicle thermal management system according to claim 1, wherein in a simultaneous cooling mode for the electric components and the battery, the coolant flow in both the first coolant line and the second coolant line is stopped, and wherein the coolant sequentially passes through the battery, the fifth valve, the first connection valve, the third valve, and the radiator, and a portion of the coolant passing through the radiator circulates through the battery and another portion of the coolant sequentially passes through the electric components, the first valve, the second valve, the first connection valve, and the third valve, and then, circulates through the radiator.

5. The vehicle thermal management system according to claim 1, wherein in a battery rapid cooling mode, the refrigerant in the refrigerant line sequentially circulates through the compressor, the condenser, the expansion valve, and the chiller, and wherein the coolant passing through the battery sequentially circulates through the fifth valve, the fourth valve, the chiller, the third valve, the cooling heat exchanger, the fourth valve, and the battery.

6. The vehicle thermal management system according to claim 1, wherein in a cooling mode, the refrigerant in the refrigerant line sequentially circulates through the compressor, the condenser, the expansion valve, and the chiller, and wherein the coolant passing through the cooling heat exchanger sequentially passes through the fourth valve, the chiller, and the third valve, and then, circulates through the cooling heat exchanger.

7. The vehicle thermal management system according to claim 1, wherein in a heating mode which absorbs heat from the outdoor air and the electric components, the refrigerant in the refrigerant line sequentially circulates through the compressor, the condenser, the expansion valve, and the chiller, wherein the coolant passing through the heating heat exchanger passes through the second valve and the condenser, and circulates through the heating heat exchanger, and wherein the coolant passing through the radiator sequentially passes through the electric components, the first valve, the chiller, and the third valve, and circulates through the radiator.

8. The vehicle thermal management system according to claim 1, wherein in a heat absorption and heating mode, the coolant passing through the heating heat exchanger passes through the second valve and the first connection valve, and a portion of the coolant passing through the first connection valve sequentially passes through the third valve, the radiator, the electric components, the first valve, the second valve, and the condenser, and then, circulates through the heating heat exchanger, and another portion of the coolant sequentially passes through the fifth valve, the battery, the electric components, the first valve, the second valve, and the condenser, and then, circulates through the heating heat exchanger.

* * * * *